United States Patent
Divo et al.

(10) Patent No.: US 7,742,158 B2
(45) Date of Patent: Jun. 22, 2010

(54) METHOD AND APPARATUS FOR LOCALLY MEASURING REFRACTIVE CHARACTERISTICS OF A LENS IN ONE OR SEVERAL SPECIFIC POINTS OF SAID LENS

(75) Inventors: Fabien Divo, Charenton (FR); James Thepot, Charenton (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 627 days.

(21) Appl. No.: 11/661,983

(22) PCT Filed: Nov. 24, 2005

(86) PCT No.: PCT/FR2005/002916

§ 371 (c)(1),
(2), (4) Date: Mar. 6, 2007

(87) PCT Pub. No.: WO2006/070084

PCT Pub. Date: Jul. 6, 2006

(65) Prior Publication Data

US 2008/0062410 A1    Mar. 13, 2008

(30) Foreign Application Priority Data

Dec. 23, 2004   (FR) .................................. 04 13877

(51) Int. Cl.
*G01B 9/00* (2006.01)
(52) U.S. Cl. ..................................... 356/126; 356/124
(58) Field of Classification Search .......... 356/124–127
See application file for complete search history.

(56) References Cited

U.S. PATENT DOCUMENTS

| | | | | |
|---|---|---|---|---|
| 3,880,525 A | * | 4/1975 | Johnson | 356/127 |
| 4,007,990 A | * | 2/1977 | McDevitt et al. | 356/124 |
| 4,641,962 A | | 2/1987 | Sueda et al. | |
| 5,581,347 A | | 12/1996 | Le Saux et al. | |
| 5,825,476 A | | 10/1998 | Abitbol et al. | |
| 5,855,074 A | * | 1/1999 | Abitbol et al. | 33/507 |
| 6,061,123 A | * | 5/2000 | Ikezawa et al. | 356/124 |
| 2003/0112426 A1 | | 6/2003 | Devie et al. | |

FOREIGN PATENT DOCUMENTS

FR         2 737 568       12/1996

* cited by examiner

*Primary Examiner*—Tarifur Chowdhury
*Assistant Examiner*—Tara S Pajoohi
(74) *Attorney, Agent, or Firm*—Young & Thompson

(57) ABSTRACT

The measurement apparatus includes: a support arranged to receive a lens; lighting element including an optical system for generating a collimated light beam directed towards the lens under measurement installed on the support; detachment elements for detaching light rays from the light beam, for detaching a localized group of at least three non-coplanar light rays grouped together about a measurement axis in a measurement cylinder of section substantially smaller than the section of the lens under measurement; acquisition elements for identifying the deflections imparted by the lens on the detached light rays and for delivering a signal representative of the deflections; and an electronic and computer system programmed to deduce from said deflections the value of the refractive characteristic of the lens at the measurement point.

50 Claims, 4 Drawing Sheets

METHOD AND APPARATUS FOR LOCALLY MEASURING REFRACTIVE CHARACTERISTICS OF A LENS IN ONE OR SEVERAL SPECIFIC POINTS OF SAID LENS

TECHNICAL FIELD TO WHICH THE INVENTION APPLIES

The present invention relates in general to measuring an optical lens such as an ophthalmic lens of a pair of correcting eyeglasses, and it relates more particularly to apparatus for measuring refractive characteristics of such a lens at one or more specific or determined points of said lens.

TECHNOLOGICAL BACKGROUND

Before mounting a pair of ophthalmic lenses for correcting eyeglasses in a frame, an optician generally seeks to verify that the main optical characteristics of the lenses, and in particular their refractive characteristics, at one or more points do indeed correspond to the prescription for which they were ordered. At present, this can consist, for example, in verifying the spherical, cylindrical, and prismatic powers and the cylindrical and prismatic orientations at one or more prescribed points. When the prescribed lens is a single-vision lens, the prescribed point where measurement is to be performed is the optical center of the lens. When the lens is bifocal, the prescribed points are the reference points for near vision and for far vision, in positions that are defined by the manufacturer in the frame of reference marked on the lens. More generally, it can be desired to verify the refractive characteristics of the lens at one or more points of interest at any positions that are determined in the frame of reference of the lens.

The refractive characteristics of a lens are indeed written by the manufacturer on the envelope in which each lens is delivered. However numerous opticians prefer to verify compliance of the actual main refractive characteristics of each lens immediately before mounting in order to eliminate any risk of error. It can also happen that the envelope bearing the prescription of a lens is missing, for example when it is desired to discover or verify the characteristics of a lens that has already been mounted or prepared for mounting.

In addition, prior to the optician mounting a lens on a frame, a lens manufacturer can also desire to verify the optical characteristics of manufactured lenses, or indeed to measure the optical characteristics of lenses from competitors.

In order to undertake such measurements and/or verifications, opticians and manufacturers thus require apparatus capable of measuring the main refractive characteristics of a lens at one or more defined points thereof.

Several categories of apparatus are known that satisfy this need more or less well. In the context of the present invention, existing apparatuses can be classified in two main categories. Thus, firstly there are narrow-field measurement apparatuses having a single measurement axis that is stationary and that are designed to perform targeted measurement on a measurement zone of small size around the measurement point, and secondly there are wide-field mapping apparatuses designed to perform measurement that is complete, or at least that extends over a large area of the lens, at a large number of points simultaneously.

Amongst narrow-field measurement apparatuses, there can be included apparatuses that have been in widespread use for many years and that are known as frontofocometers. One of the first apparatus of that kind is described in U.S. Pat. No. 1,383,678. The principle on which the apparatus operates has remained unchanged since then. There have merely been applied thereto improvements of an electronic nature seeking to provide assistance in assessing the refractive power of the lens in the measurement zone, and also relating to the user interface. That apparatus continues to give satisfaction at the present time, in particular in terms of measurement accuracy when it is used, as generally happens, by an operator who is qualified and practiced. However taking a measurement is relatively lengthy and it cannot be delegated, without risk of error, to an operator having lesser qualifications or who is a beginner. The use of that apparatus thus tends to impact on the profitability or the quality of the work carried out by an optician.

That apparatuses is characterized by the fact that it possesses a single and stationary measurement axis on which there is arranged a narrow-field system for observing the lens. It is therefore up to the operator to manipulate the lens that is to be measured so as to bring the point of interest of the lens (the measurement point) onto the optical axis of the apparatus in order to measure one or more of the refractive characteristics of the lens. The operator can then assess the refractive power of the zone of the lens (the measurement zone) that is situated in the field of the apparatus. The measurement zone is narrow, and in practice it presents a diameter of about 8 millimeters (mm). It will be understood that under such conditions, using apparatus of that kind requires manipulations to be performed that take time and that lead to inaccuracy in the event of the measurement point of the lens not being positioned with precision on the measurement axis of the apparatus. In addition, if it is desired to make a plurality of measurements on a single lens at a plurality of points thereof, as happens for example when measuring powers and axes at reference points for near vision and for far vision on a multifocal lens, it is necessary to increase the number of manipulations, thereby further lengthening the time required for measurement.

Another narrow-field measurement technique dedicated to measuring the refractive powers of single-vision lenses in their centers, is described in the article "Testing and centering of lenses by means of a Hartmann test with four holes", Optical Engineering, Vol. 31, No. 7, pp. 1551-1555, Jul 1992, Malacara. Apparatus implementing the technique described in that document is described in greater detail in U.S. Pat. No. 3,880,525. That apparatus comprises:
  a support arranged to receive such a lens;
  on a first side of the lens support, lighting means including an optical system for generating a collimated beam of light rays directed towards the ophthalmic lens installed on said support;
  on a second side of the support, means for measuring the deflection imparted by the lens on said light rays, said means comprising a projection screen onto which the shadow of the lens is projected, and means for reading and digitizing the image projected onto the projection screen; and
  means for detaching light rays from the light beam and suitable for detaching a localized group of at least three non-coplanar light rays that are grouped together about a measurement axis passing through the center of the lens, so that the detached rays occupy a measurement cylinder having a diameter that is substantially smaller than the diameter of the lens under measurement.

In practice, the ray detachment means comprise a mask perforated by a few holes, typically four holes, for passing a corresponding number of light rays as detached thereby from the beam. Unlike mapping apparatuses, the detached rays are grouped together about a stationary measurement point that coincides with the center of the lens and they are contained within a radius of a few millimeters in order to obtain an accurate value for the local power at the center of the lens. It is specified that overall measurement over a larger area of the lens, or indeed over the entire lens, would be inaccurate insofar as the refractive characteristics of the lens over the remainder of its surface differs substantially from those measured in its localized central zone. In any event, the measurement axis of that apparatus is single and stationary.

Under such conditions, it can immediately be seen that that apparatus presents limits and drawbacks. Its field of application is restricted to single-vision lenses and under no circumstances does it make it possible to measure the refractive characteristics of a lens at points other than its geometrical center, without moving the lens and the associated loss of time and risk of error that such manipulation engenders, as mentioned above for frontofocometers.

Finally, wide-field mapping measurement apparatuses are known that can be thought of as apparatuses having multiple stationary measurement axes, in that they are designed to perform a plurality of measurements of the refractive powers of the lens simultaneously at a large number of measurement points that are regularly distributed over the entire area of the lens to be measured. Such an apparatus typically implements Hartmann or equivalent tests of the kind described in the article "Hartmann test", Optical Shop Testing, Chap. 10, pp. 367-396, I. Ghozeil, edited by D. Malacara, 1992. An example of such an apparatus is described in U.S. Pat. No. 4,641,962, for example. Those mapping apparatuses have lighting means for generating a collimated beam of parallel light rays directed towards the lens, a beam separator for separating the beams into a plurality of light rays that are regularly spaced apart for passing through the lens at a multiplicity of points distributed over the entire area of the lens, and a projection screen associated with a sensor and with measurement means. The measurement means serve to measure the deflections imparted by the lens to the various light rays, and then to draw up one or more maps of the power(s) of the lens over its entire area.

Those apparatuses are useful in particular when it is desired to obtain an overall view of the refractive characteristics of the lens and how they are distributed over various zones thereof. However they do not give entire satisfaction when used for measuring refractive characteristics at a small number of specific points of the lens, mainly because of their lack of accuracy, their slowness, and their expense. Those apparatuses measure power over the entire area of the lens, which specifically implies performing measurements using rays that are distributed over the entire lens at a pitch that is not sufficiently fine or that is inaccurately centered or aligned with the position of the measurement point under consideration. The mapping feature of the measurement also implies, for electronic processing of the measurement, large memory requirements for storing the complete map of the lens, long calculation time for drawing up the map, and deflection-measuring means that are complex or inaccurate, since such measurement means ought to perform accurate measurements of all points of the lens simultaneously. The Applicant has observed that most of the points measured are not useful in verifying the prescription characteristics of an ophthalmic lens. In particular there is an identification problem of distinguishing between the various points of impact of the light rays on the projection screen, in order to associate each of them individually with the rays from which they are derived, and in spite of the large number and the closeness of ray impact points on the projection screen. Solving this identification problem requires specific identification means to be implemented which, in order to be reliable, turn out to be relatively complex, to consume large amounts of resources (processor time in particular), and to be expensive.

Furthermore, measured deflections of the lens are mapped using a Hartmann or equivalent mask or matrix which, in order to make accurate measurement possible, ought to have a pitch that is as fine as possible. Unfortunately, having beam separator elements (patterns, microlenses, etc.) that are close together leads firstly to an increased amount of computation, and secondly to worsening the identification problem, so that solving it then requires more complex identification means to be implemented.

SUMMARY OF THE INVENTION

An object of the present invention is to provide a method and apparatus for measuring refractive characteristics as an alternative to existing methods and apparatuses, making it possible to perform local measurements on a lens at specific points thereof in a manner that is fast and accurate, while saving on the hardware resources implemented. Another object of the invention is to make such measurement automatic.

To this end, the invention provides a method of measuring at least one refractive characteristic of a lens at at least one specific measurement point of said lens by measuring deflection, the method comprising the steps consisting in:
    generating a collimated light beam directed towards the lens;
    detaching a localized group of at least three non-coplanar light rays from the light beam, these light rays being grouped together about a measurement axis in a measurement cylinder of section that is substantially smaller than that of the lens under measurement;
    measuring the deflection imparted by the lens on the light rays; and
    deducing therefrom the value of the refractive characteristic of the lens at the measurement point.

The lens under measurement remains stationary relative to the light beam, and the position of the measurement axis is variable from one measurement to another in order to be adapted to the position of the measurement point.

The invention also provides apparatus for measuring at least one refractive characteristic of a lens at at least one specific point of the lens, the apparatus comprising:
    a support arranged to receive a such lens, on its own or mounted in a frame;
    on a first side of said support, lighting means including an optical system for generating a collimated light beam directed towards the lens installed on said support;
    on one side or the other of the support, detachment means for detaching light rays from the light beam, suitable for detaching a localized group of at least three non-coplanar light rays grouped together about a measurement axis in a measurement cylinder of section that is substantially smaller than the section of the lens under measurement;
    on a second side of the support, acquisition means suitable for identifying the deflections imparted by the lens under measurement on said detached light rays and for delivering a signal representative of said deflections; and
    an electronic and computer system programmed to deduce from said deflections the value of the refractive characteristic of the lens under measurement at the measurement point.

According to the invention, the support is stationary relative to the beam coming from the lighting means, and the detachment means for detaching the light rays possess variable geometry controlled by the electronic and computer system to modify the position of the measurement axis as a function of the position of the measurement point.

By selecting which light rays are detached, the position of the measurement axis can thus be modified on each measurement so as to coincide, at least approximately, with the position of the measurement point under consideration on the lens. The measurement as performed in this way focuses on a narrow field around one or more measurement axes that are movable or variable. This combined feature of a measurement field that is both narrow and movable distinguishes the method of the invention fundamentally from mapping type measurement using a field that is wide together with multiple stationary measurement axes. This thus obtains the advantages of targeted measurement: a combination of accuracy together with parsimonious requirements for resources. In particular, identification to distinguish ray impacts on the projection screen can be performed in simple and fast manner, insofar as it is implemented on a small number of rays over a small area. Furthermore, unlike prior art apparatuses having a narrow field and a stationary measurement axis, such as frontofocometers, the measurement axis is not frozen. The measurement axis can be moved by selecting appropriate rays for passing through the point of the lens where it is desired to make a measurement.

This thus achieves the versatility in measurement of a mapping apparatus. However, by restricting deflection measurements to the vicinity of the point of interest, there is no need to measure all of the other points of the lens that are useless, and there is no need to compute the map of levels or points over the entire lens, nor is there the technical problem of identifying ray impacts. This thus saves on resources that are expensive in terms of measurement and computation while improving the accuracy of the final measurement at the specific point of interest.

Advantageously, the detached light rays are selected automatically as a function of the position of the measurement point, such that the measurement axis passes close to or through the measurement point under consideration, and without moving the lens.

More precisely, the measurement axis is such that detached light rays strike the lens at a group of impact points presenting a center of gravity that coincides with the point of impact of the measurement axis on the lens. The measurement axis intersects the lens at a distance of less than 1 mm from the measurement point under consideration.

In a particularly advantageous embodiment, the light rays of the beam are detachable in a predefined geometrical configuration, and the rays that are detached are selected in such a manner that the measurement axis intersects the lens as close as possible to the measurement point under consideration. The detachment means are therefore designed to detach a predetermined set of detachable light rays selectively, and the electronic and computer system is programmed to control the detachment means in such a manner as to select the detached light rays automatically so that the measurement axis intersects the lens as close as possible to the measurement point under consideration. For example, in practice, the means for detaching the rays from the light beam comprise a transparent active mask or screen that is stationary relative to the lens and that is suitable, under the control of the electronic and computer system, for selectively displaying, in positive or negative form, at least two distinct groups, each of at least three detachment patterns, of rays grouped together about at least two distinct measurement axes. For example, the active mask is a graphics screen having an array of patterns that are individually activatable under the control of the electronic and computer system. Typically it is constituted by a liquid crystal display (LCD) screen. The electronic and computer system is programmed to activate a given number of patterns and to select which patterns are activated from the set of patterns constituting the array of the detachment mask in such a manner that the center of gravity of the activated patterns is situated as close as possible to the measurement point under consideration.

In another embodiment, the means for detaching rays from the light beam comprise a passive mask having at least three permanent ray-detachment patterns and movable with one or two degrees of freedom perpendicularly to the measurement axis.

According to another characteristic of the invention that is advantageous, the light rays are grouped together about the measurement axis within a radius of less than 10 mm, and preferably of less than 5 mm. Typically, the light rays are grouped together about a measurement axis within a radius lying in the range 3 mm to 4 mm.

Advantageously, the measurement point applies to at least one position that is distinct from the optical center and the geometrical center of the lens. The method is applied to measuring at least one refractive characteristic at at least two distinct points of a single lens. When the lens under measurement is of the multi-focal type, the optical characteristic is measured at the reference point for far vision and at the reference point for near vision of the lens. It is then possible to proceed in two different ways. In a first implementation, measurements are performed successively at each measurement point, with the position of the measurement axis being modified on each measurement to coincide, at least approximately, with the position on the lens of the measurement point under consideration, and without moving the lens. In a second implementation, a plurality of localized groups of light rays are detached simultaneously, the groups occupying measurement cylinders possessing sections that are substantially smaller than that of the lens and not overlapping.

According to another advantageous aspect of the invention relating to solving the above-mentioned identification problem quickly and simply, in order to measure the deflections imparted by the lens on the light rays detached from the beam, the positions of the impacts of said rays on a projection screen are identified and the various impacts are distinguished from one another so as to be associated individually with the rays from which they are derived, exclusively on the basis of their positions on the projection screen. Under such circumstances, the impacts of the rays are distinguished exclusively by their distribution order on the projection screen.

According to yet another advantageous characteristic of the invention, the method includes a step consisting in acquiring the position of the measurement point in an absolute frame of reference and automatically selecting the localized group of detached light rays so that the measurement axis passes close to the measurement point. Advantageously, the step of acquiring the position of the measurement point includes a step of reading marking on the lens (L) to be measured.

Under such circumstances, the method advantageously includes preliminary steps of:
- defining the position of a frame of reference of the lens in the absolute frame of reference;
- defining the position of the measurement point in the frame of reference of the lens; and
- deducing therefrom the position of the measurement point in the absolute frame of reference.

For a lens that is an ophthalmic lens for eyeglasses presenting marking that defines its frame of reference, the step of defining the frame of reference of the lens is preceded by a step of determining the positions of the marking in the absolute frame of reference, from which the position of its frame of reference in the absolute frame of reference is deduced by calculation.

For a lens that is an ophthalmic lens for eyeglasses, the method includes a step of identifying marking or lack of marking on the ophthalmic lens, from which the type of the ophthalmic lens is deduced. The number and/or the position(s) of the measurement point(s) in the frame of reference of the lens are advantageously deduced, at least in part, from the marking and/or from the type of the lens.

BRIEF DESCRIPTION OF THE DRAWING FIGURES

The following description with reference to the accompanying drawings of an embodiment given by way of non-limiting example makes it possible to understand what the invention consists in and how it can be implemented.

Figure 4:
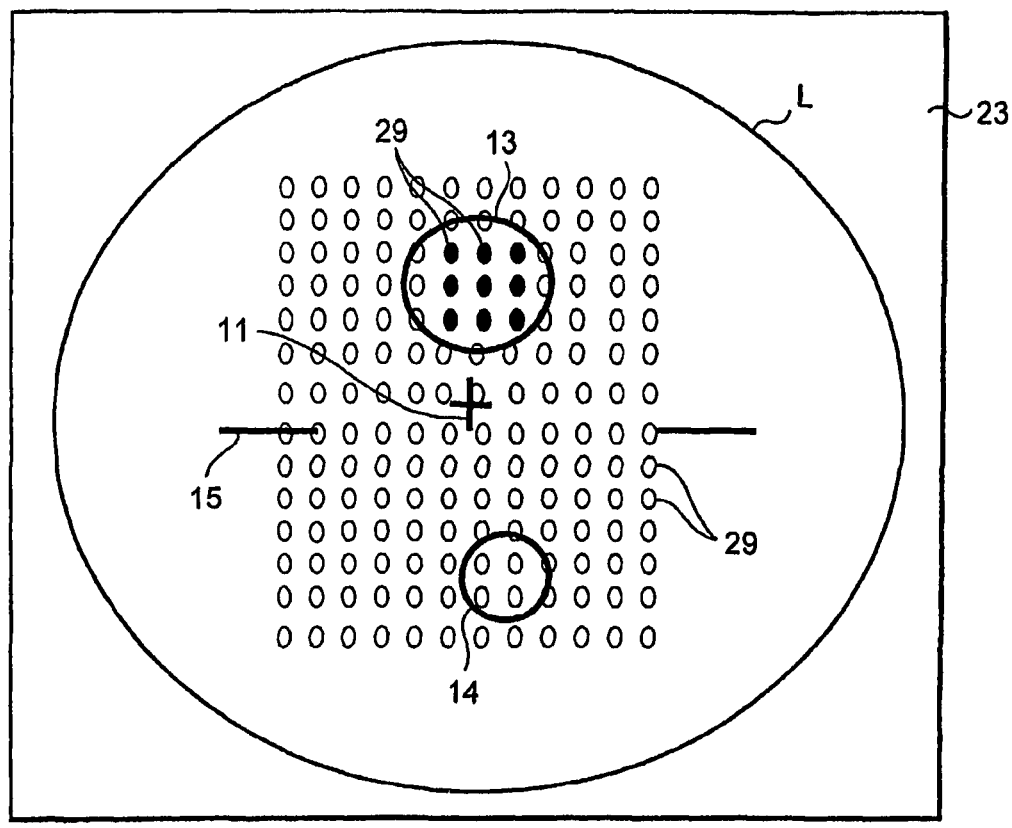
FIG. 4 is a plan view of the FIG. 3 lens which, after being placed in the measurement apparatus, is superposed on the active mask with a group of light rays pointed at and concentrated around the reference point for far vision being detached by activating corresponding pixels of the LCD mask.
Figure 5:
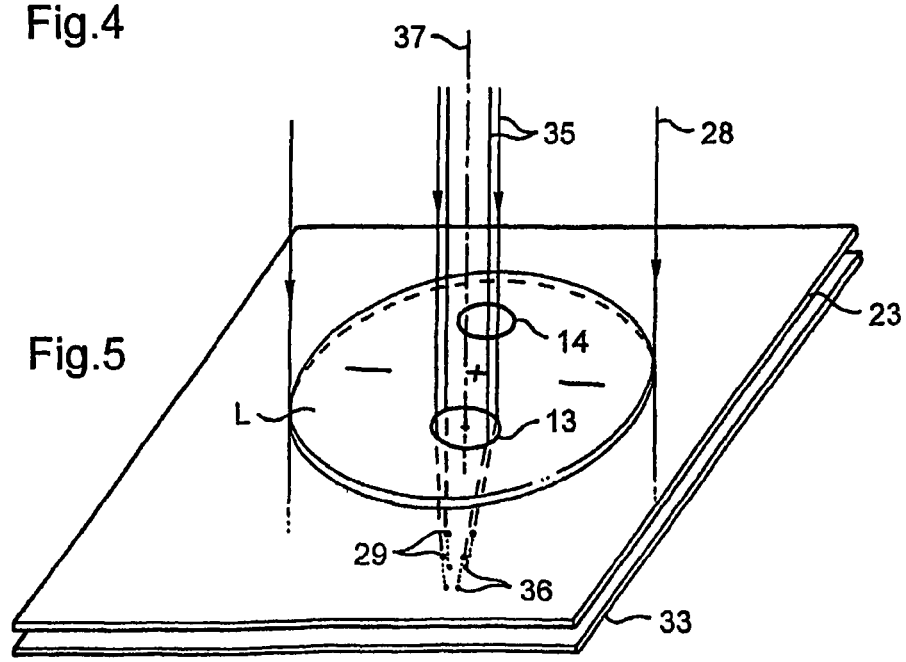
Figure 6:
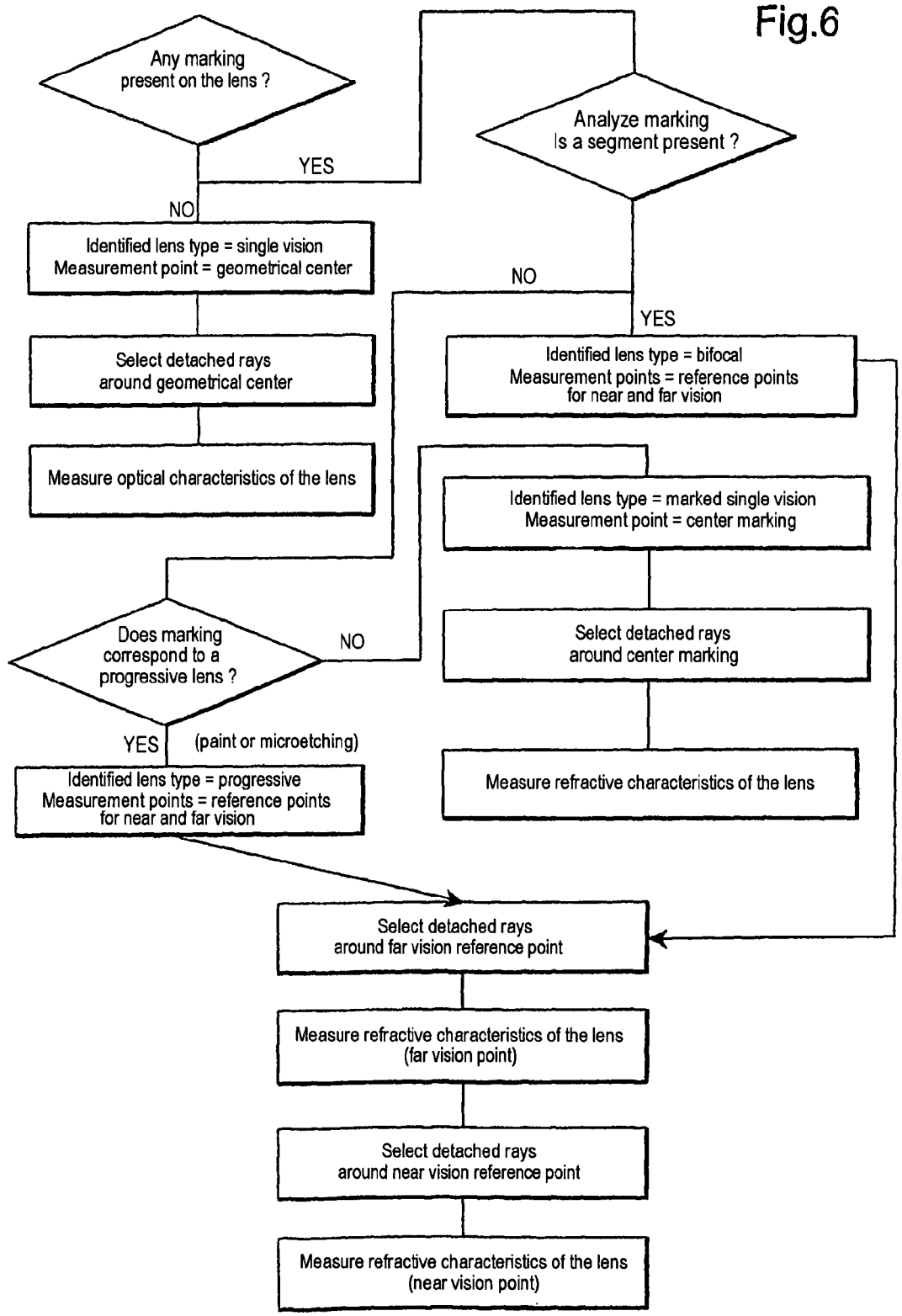

FIG. 5 is a perspective view in a configuration analogous to that of FIG. 4 and showing four detached rays around the reference point for far vision of a progressive lens, the rays being detached by activating corresponding patterns of the active mask, and serving to measure the power of the lens at the reference point for far vision; and FIG. 6 is a flow chart of an algorithm of the program performed by the electronic and computer system in response to the ophthalmic lens marking detected by the image recognition means.

DETAILED DESCRIPTION OF THE INVENTION

Figure 1:
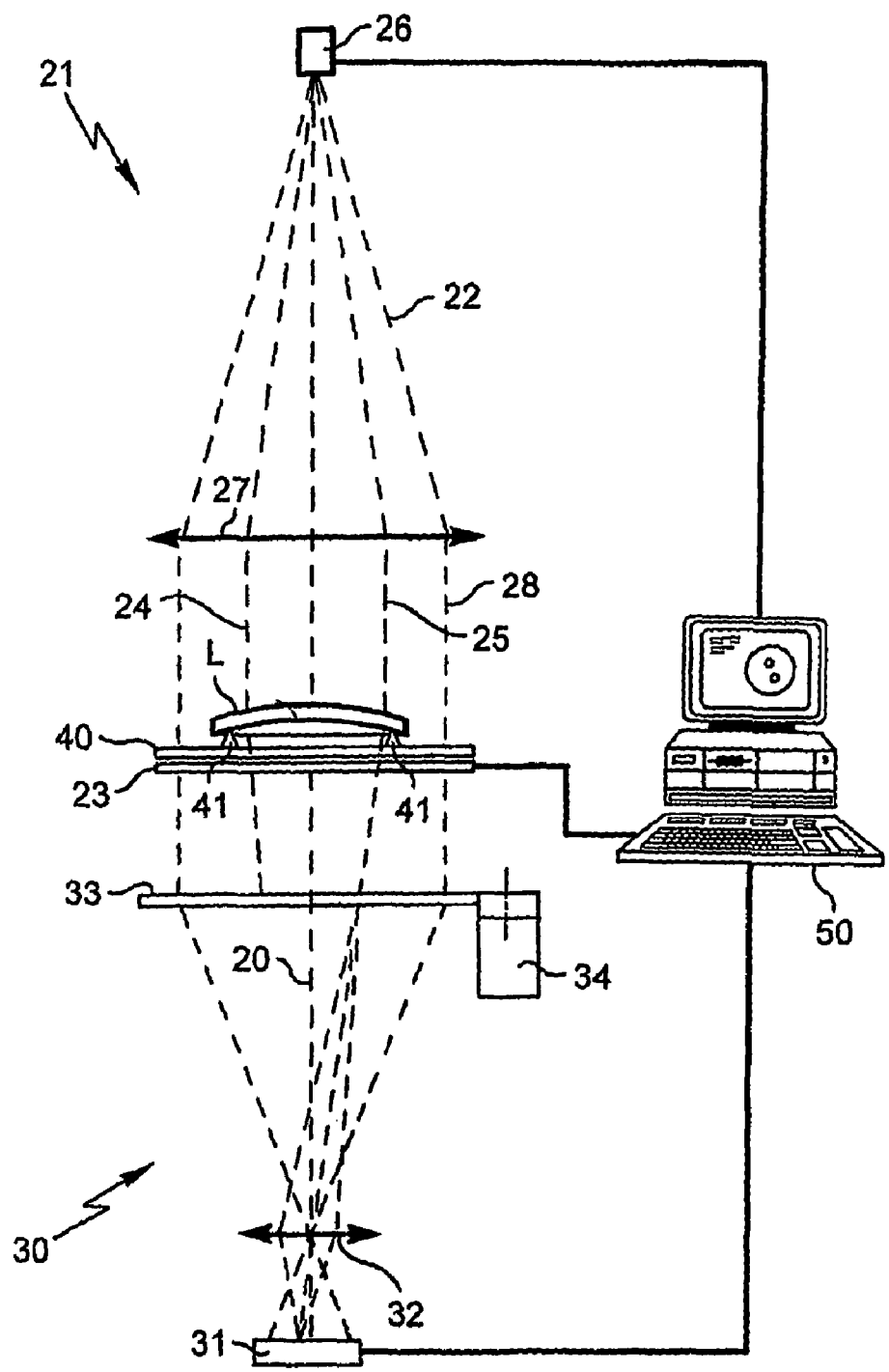
FIG. 1 is an overall diagrammatic view of apparatus of the invention for measuring the refractive characteristics of a lens.

FIG. 1 is a diagram showing the main components of an automatic measurement apparatus in accordance with the invention.

The apparatus serves to measure the refractive characteristics of an ophthalmic lens L at one or more specific points of the lens, where said characteristics may be its spherical, cylindrical, and prismatic powers, including the orientations for the cylindrical and prismatic powers.

The apparatus comprises a stationary support 40 arranged to receive the ophthalmic lens L that is to be measured, and prior to the lens being cut to shape. The lens L is received horizontally with its convex front face facing upwards. Specifically, the support 40 consists of a glass plate provided with a tripod 41. Naturally, it would be possible to use any other type of lens support that gives free access to its zones for measurement, such as a three-branch clamp that performs concentric clamping by holding the lens for measurement via its edge. The lens for measurement L is put into place on the support 40 by the operator or by an automatic handling member. The lens is placed on the support 40 in arbitrary manner, or at least without any accurate mechanical centering, and thereafter, it is not handled or moved additionally in any other way.

On either side of the support 40, the measurement apparatus of the invention comprises, along a vertical main optical axis 20:

on a first side of said support, lighting means 21 including an optical system for generating a collimated light beam 22 directed towards the ophthalmic lens L installed on the support;

on a second side of the support, detachment means 23 for detaching certain light rays such as the rays 24, 25, and 35 from the light beam 22, 28, and suitable for detaching a localized group of at least three non-coplanar light rays grouped about a measurement axis passing through the measurement point of the lens, in a measurement cylinder of section that is substantially smaller than the lens under measurement;

on a second side of the support, acquisition means 30 suitable for detecting deflections imparted by the lens on said detached light rays and for delivering a signal directly or indirectly that is representative of said deflections; and an electronic and computer system 50 controlling the lighting means 21 and the detachment means 23, receiving the signal delivered by the acquisition means 30 and programmed in particular to deduce from the deflections detected by the acquisition means the value of the refractive characteristic of the lens at the measurement point.

The lighting means 21 are disposed above the support for the lens L and comprise an optical system for generating a collimated light beam directed towards the ophthalmic lens installed on said support. Specifically, the lighting means comprise a light source 26 that is arranged to illuminate the lens L in the measurement position. This source 26 is a point source suitable for providing a diverging beam that is directed towards the lens L. By way of example, it can be implemented in the form of a light-emitting diode (LED) or a laser diode, preferably associated with an optical fiber.

The optical system of the lighting means 21 further comprises a collimator lens 27 centered on the optical axis 20 and placed between the source 26 and the support for the ophthalmic lens L under measurement. This collimator lens 27 serves to generate downstream therefrom a beam 28 of parallel light rays. This beam is of large size, greater than the size of the lens L.

On the other side of the support 40 for the lens L, and thereunder, there are disposed the detachment means 23. These detachment means are suitable for detaching the localized group of at least three non-coplanar light rays grouped together about a measurement axis 37 passing through the measurement point of the lens in a measurement cylinder of section that is substantially smaller than the lens L being measured. The measurement axis 37 is defined by the fact that the detached light rays 35 strike the lens L in a group of impact points presenting a center of gravity that coincides with the point of impact on the lens L of the measurement axis 37.

In accordance with an essential characteristic of the invention, since the support 40 for the lens L is stationary relative to the lighting means, the light ray detachment means possess variable geometry under the control of an electronic and computer system 50 for modifying the position of the measurement axis as a function of the position of the measurement point. More precisely, the detachment means 23 are designed to enable the detached light rays to be selected automatically so that the position of the measurement axis can be modified on each measurement so as to pass through the measurement point under consideration, and without moving the lens L.

Specifically, the detachment means for detaching rays from the light beam are constituted by a transparent active mask 23 of dimensions greater than those of the lens L to be measured, and having an activatable portion of dimensions that are sufficient to cover the major fraction of the lens, or at least as shown in FIG. 4, to cover the near and far vision zones of a progressive ophthalmic lens. This mask is placed downstream from the ophthalmic lens L, i.e. between the support 40 for the lens L and the analysis means. The active mask 23 is placed in stationary and centered manner on the vertical main optical axis 20 of the lighting means and of the analysis means 30. This optical axis 20 is the axis that is common to some of the lenses of the optical system centered relative to the source 26 and of a light receiver 31 forming part of the analysis means 30 and situated on the other side of the support 40 for the lens L.

The active mask 23, under the control of the electronic and computer system 50 is suitable for selectively displaying in positive or negative manner at least two distinct groups of at least three patterns for detaching rays grouped around at least two distinct measurement axes.

Figure 2:
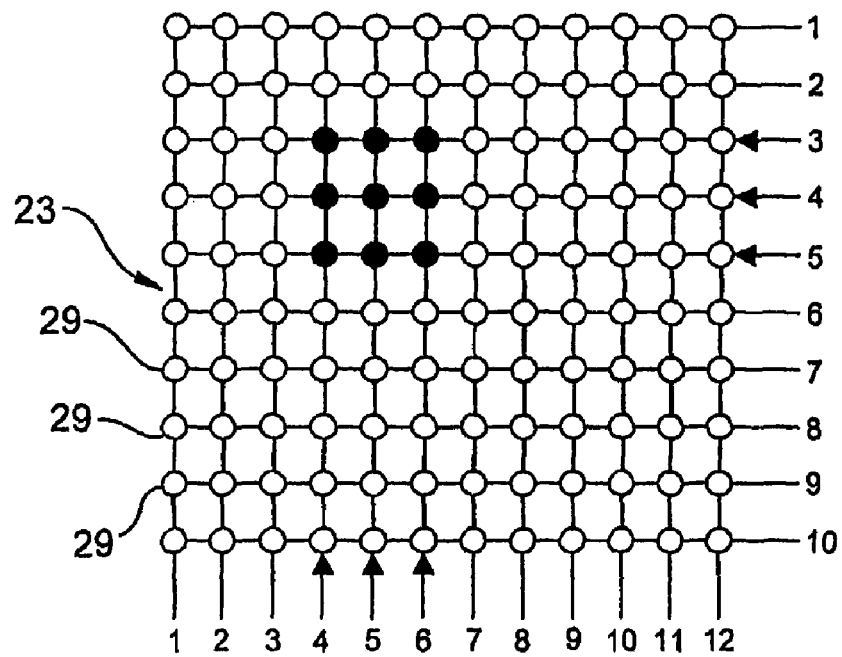
FIG. 2 is a plan view of the active mask on its own, implemented in the form of an LCD graphics screen.

In the example shown, and as can be seen in FIG. 2, the active mask possesses a plurality of opaque patterns that are individually activatable and deactivatable under the control of the electronic and computer system. The mask 23 shown has an array of patterns, in this embodiment patterns that are circular or oval and that are regularly distributed over a rectangle centered on the geometrical center of the circular outline of the lens L and having a side of length approximately equal to the radius of the lens L.

Typically, the active mask 23 can be made in the form of a transparent liquid crystal display (LCD) screen, or the like, as in the embodiment described. The mask may be constituted by a specific screen carrying an array of patterns of size and spacing specific to the apparatus. However, it is also possible to use a commercially-available graphics screen in which pluralities of smaller pixels are activated in order to build up such patterns. In other words, the pixels of the screen forming the active mask 23 may be Hartmann points or patterns (i.e. patterns that are spaced apart), as in the embodiment shown, or they may be contiguous pixels of the kind to be found in standard graphics screens.

The diagram of FIG. 2 gives an example of an active mask enabling a restricted zone of the lens L to be selected where light rays are to be detached. In this embodiment, the mask is constituted by a transparent LCD screen carrying an array of patterns or pixels (in this case of round or oval shape) that are individually addressable and distributed in 10 rows of 11 columns. With this type of LCD screen it is possible to switch on any group of pixels. For activation purposes, the patterns or pixels 29 are individually row and column addressed by the system 50 via an electronic interface card (not shown). To activate a pixel, i.e. to make it opaque, the system 50 activates the row and the column corresponding to the pixel. Thus, in the example of FIG. 2, the electronic and computer system 50 activates rows 3, 4, 5 and columns 4, 5, 6 in order to activate the nine points corresponding to those coordinates.

The electronic and computer system 50 is programmed to activate a given number of patterns 29 disposed in a predefined and unvarying arrangement, and to select which patterns to activate from the set of patterns constituting the array of the detachment mask 23 so that the center of gravity of the activated patterns is situated as close as possible to the measurement under consideration.

In any event, the patterns of the mask can be activated in small groups, generally comprising fewer than about ten patterns, for the purpose of detaching a localized group of rays from the beam. It will be understood that in order to perform deflection measurement at a specific point, the activatable patterns of the mask are never all activated simultaneously, as would be the case when performing mapping. The maximum number of light rays detached in this way is 40 and the rays are grouped together about the measurement axis within a radius of less than 10 mm, and preferably the maximum number of rays is 20 and they are grouped together within a radius of less than 5 mm. Calculation and testing have shown that best results are obtained with a number of light rays lying in the range 3 to 9 and distributed within a radius lying in the range 3 mm to 4 mm.

Thus, the detachment means 23 are designed in this embodiment to selectively detach a predetermined set of detachable light rays, and the electronic and computer system 50 is then programmed to control the detachment means 23 in such a manner as to select the detached light rays 35 automatically so that the measurement axis 37 intersects the lens L as close as possible to the measurement point under consideration.

In a variant, or in combination, it is possible to provide for the electronic and computer system 50 to be programmed to control the detachment means 23 in such a manner as to select the detached light rays 35. automatically so that the measurement axis 37 intersects the lens L within less than 1 mm from the measurement point under consideration.

In the embodiment shown in FIG. 4, nine contiguous patterns have been activated to detach a corresponding number of light rays passing through the zone defined by the far vision circle 13 of the lens L. These rays as detached in this way are distributed about a measurement axis that passes close to, or more precisely as close as possible to, the measurement point which is the reference point for far vision, i.e. the center of the far vision circle 13.

In the embodiment shown in FIG. 5, which embodiment is similar to that of FIG. 4, the system 50 has activated four patterns 29 situated at the four corners of a square on the active mask 23. These four patterns (in this example constituting a square) detach four rays 35 from the beam 28 passing through or close to the far vision circle 13 and thus distributed around a measurement axis 37 passing through the far vision reference point situated at the center of the far vision circle 13. In FIG. 5, it can be seen that the detached rays 35 are deflected by the lens L as a function of the refraction powers of the lens in the far vision zone in the vicinity of the far vision reference point. The rays as deflected in this way, after they have been detached by the active mask 23, strike the projection screen 33 at impact points that are represented by the shadows 36 of the activated patterns 29 of the mask 23. The positions of these shadows 36 are detected by the acquisition means 30.

In a variant to the above-described active screen, it is also possible to provide for the means for detaching the rays from the light beam to be implemented in the form of a passive mask having at least three permanent ray detachment patterns and movable with one or two degrees of freedom perpendicularly to the measurement axis.

The acquisition means 30 are located beneath the detachment means. In co-operation with an electronic and computer system, these acquisition means are suitable for measuring the deflection imparted by the lens on the detached light rays, and for deducing therefrom the value of the refractive characteristic of the lens at the measurement point.

The acquisition means comprise a detached ray projection screen and a position sensor for sensing the positions of the impacts of said rays on the projection screen.

The position sensor in this embodiment is constituted by the above-mentioned light receiver 31. By way of example, it may be constituted by a matrix sensor or by a camera with an objective lens. If the light receiver is a matrix sensor, it is associated with an objective lens 32 and possibly also with a diaphragm (not provided in the embodiment shown). If the light receiver is a camera, these elements are replaced by the objective lens of the camera.

The projection screen is a ground translucent screen 33 interposed perpendicularly to the optical axis 20 (i.e. horizontally) between the support 40 for the lens L and the light receiver 31. The ground translucent screen is preferably made of glass or the like, being ground at its surface for diffraction purposes. For example it may be constituted by a disk mounted to rotate and driven in rotation by a motor 34 about the optical axis 20.

The apparatus of the invention serves to measure the spherical, cylindrical, or prismatic refraction power at any point of interest of the lens, which point may be other than the optical or geometrical center of the lens. The electronic and computer system 50 thus possesses at least one mode of operation in which it controls the light ray detachment means to select the group of light rays in such a manner that the measurement axis passes close to a determined measurement point that is clearly distinct from the optical center and the geometrical center of the lens, and to do so without moving the lens.

It can be useful to measure the refraction power at a plurality of points of interest on a single lens. For this purpose, the electronic and computer system 50 possesses at least one mode of operation in which it causes the light ray detachment means 23 to select successively or simultaneously at least two groups of distinct light rays grouped about two distinct measurement axes passing through two distinct measurement points of a single lens. This applies typically when it is desired to measure the power values at the reference point for far vision and at the reference point for near vision.

In practice, the electronic and computer system 50 possesses a memory recording a marker concerning the multi-focal or single-vision type of the lens being measured. The electronic and computer system 50 is programmed so that if the marker indicates that the lens to be measured is of the multi-focal type, it controls the light ray detachment means 23 to select simultaneously or successively two groups of light rays about two distinct measurement axes, one passing through the reference point for far vision and the other through the reference point for near vision of the multi-focal lens.

The measurement apparatus further comprises identifier means for identifying the position of the measurement point. These identifier means comprise:

means for defining and storing in a memory of the electronic and computer system 50 the position of a frame of reference of the lens in an absolute frame of reference; and means for defining and storing in a memory of the electronic and computer system 50 the position of the measurement point in the frame of reference of the lens.

Specifically, the means for defining and storing the position of a frame of reference of the lens in an absolute frame of reference comprise image recognition means suitable for locating markings on the ophthalmic lens and for deducing therefrom the position of the lens frame of reference in the absolute frame of reference.

These image recognition means are constituted firstly by acquisition means 30 that deliver a signal representative of the shadow of the lens L under the light beam 22, 28, and secondly an image recognition program executed by the electronic and computer system 50 using conventional image recognition principles.

The image recognition means are also suitable for identifying marking or the absence of marking on the ophthalmic lens, for deducing therefrom the type of ophthalmic lens, and for writing in the memory of the electronic and computer system the marker that corresponds to the type detected for the lens.

There are several types of ophthalmic lens: single-vision lenses, progressive lenses, or lenses with a power discontinuity (bifocal or trifocal lenses). These various types of lens are easily identifiable without it being necessary to measure the optical characteristics of the prescription, by using the marking or identifier of the lens.

Lens markings or identifiers include the following:

paint markings on progressive lenses, such marking defining at least an axis, a centering point, a far vision control zone (VL) at the center of which there is the far vision reference point, and a near vision control zone (VP) at the center of which there is the reference point for near vision;

microetching on lenses of the same type, such etching defining a frame of reference of the lens and in particular the axis of the lens, the top and the bottom of the lens, and the horizontal position of the reference center or prism reference point;

curved or flat segments defining an axis of orientation of the lens (segment), a centering point (middle of the segment), and a near vision zone (inside of the segment) and a far vision zone (outside and above the segment);

round segment pellets defining a near vision zone (inside the pellet) and a far vision zone (outside and above the pellet); and paint marks on certain single-vision lenses, defining an axis and a centering point (generally a cross).

Lenses that do not present any marking or identifiers are generally single-vision lenses.

With reference more particularly to ophthalmic lenses presenting progressive power addition, it is known that during manufacture any progressive lens is provided with temporary identifiers in the form of paint markings and permanent identifiers in the form of etching. The temporary identifiers make it convenient to center the lens before it is mounted. The permanent identifiers serve to identify, once mounted on the patient's frame, the nature of the progressive ophthalmic lens, the value of the addition, and also to verify or correct the exact centering of said lens after the temporary identifiers have been erased. It will be understood that the temporary identifiers are erased by the optician before handing the eyeglasses to a client and, where necessary, they can be reconstituted on the basis of the etched permanent identifiers that remain on the ophthalmic lens.

Figure 3:
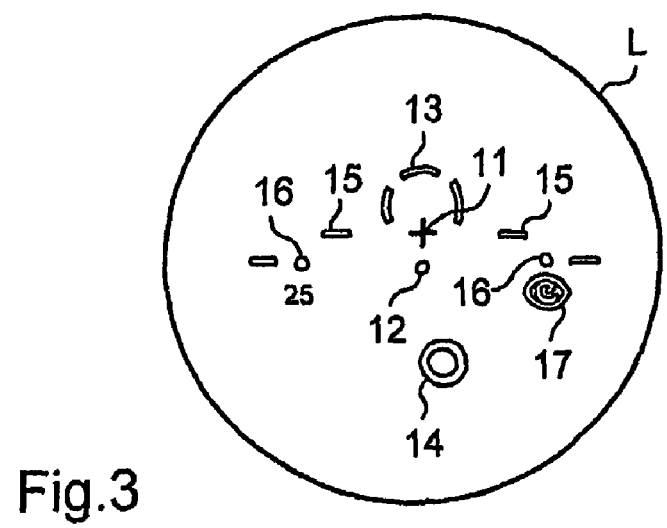
FIG. 3 is a plan view of the front face of a progressive correcting lens showing the conventional marking of said lens.

More precisely, and as shown in FIG. 3, the temporary identifiers conventionally comprise:

a mounting or centering cross 11 marking the center of the far vision zone that is to be positioned in register with the center of the wearer's pupil when the wearer is looking straight ahead to infinity; it serves to position the power progression of the lens L1 vertically and horizontally relative to the eye, so as to enable the wearer to find easily the correcting power needed for far vision, for intermediate vision, and for near vision in the manner intended by the designer of the lens;

a central point 12 situated, depending on the type of lens, 2 mm to 6 mm beneath the mounting cross 11 and locating the "optical center" of the lens L1; this "optical center" for a progressive lens is conventionally the "prism reference" point where the nominal prismatic power of the lens L that corresponds to the prescription for the wearer is measured;

a circle 13 for measuring the far vision power of the lens, which circle is situated in the upper portion of the lens L1 immediately above the mounting cross 11 and locating at its center the reference point for far vision; traditionally, it constitutes the point that, in the prior art, the optician would bring into register with the endpiece of a frontofocometer in order to measure the far vision power of the lens L1;

a circle 14 for measuring the near vision power of the lens, which circle is situated in the lower portion of the lens L1 and surrounds the center or reference point of the near vision zone; this center is offset towards the nasal side by 2 mm to 3 mm, and the distance between it and the mounting cross 11 constitute the nominal length of the progression of the lens L1; and one or more lines 15 identifying the horizontal for the lens L1 to be used for centering purposes.

FIG. 3 also shows the permanent identifiers that generally comprise:

two small circles or signs 16 located on the horizontal of the lens L1, passing through its optical center and always situated at 17 mm on either side of the optical center 12; these etchings enable horizontal and vertical centering of the lens to be found;

a sign 17 suitable for identifying the trademark and the exact nature of the progressive lens (e.g. V for Varilux®) which is etched under the small circle or sign on the nasal side; and a 2- or 3-digit number representing the value of the addition (e.g. 30 or 300 for an addition of 3.00 D) which is etched under the small circle or sign on the temporal side.

It should be recalled that for multi-focal lenses presenting one or more power discontinuity lines (e.g. defining a near vision zone or "segment"), these lines act as permanent identifiers.

When a lens L to be measured is placed on the support 41, its image or shadow under the light beam 22, 28 is picked up by the acquisition means 31 without selecting any particular rays, i.e. without the mask 23 being activated in order to display any detachment pattern. The mask 23 thus remains transparent or neutral and the acquisition means perceive the image of the lens L together with any marking thereon. The electronic and computer system 50 is programmed to recognize automatically, using a suitable image recognition algorithm, these various markings or identifiers (or the absence thereof), and to deduce therefrom the type of the lens.

Nevertheless, lens type recognition may also be performed manually, with the information then being input into the electronic and computer system 50.

The electronic and computer system 50 is programmed to deduce automatically from the type of the lens the number and/or position of the measurement point(s) in the frame of reference of the lens.

The electronic and computer system 50 is also programmed to deduce the position of the frame of reference of the lens L in the absolute frame of reference and also the position of the measurement point in the frame of reference of the lens, and the position of the measurement point in the absolute frame of reference, and to control the detachment means to select automatically the localized group of detached light rays such that the measurement axis passes close to said measurement point.

Recognition of the type of the lens is used by the program of the system 50 to determine the point(s) of interest (or measurement points) of the lens.

More precisely, the electronic and computer system is programmed as follows, in application of the algorithm shown in FIG. 5.

If the lens presents no marking, the lens is classified as being a single-vision lens. The zone of interest (vicinity of the optical center) is close to the geometrical center of the lens. The system then controls the active mask 23 so that it detaches a group of light rays around a measurement axis that passes through the geometrical center of the lens L. The program of the system 50 compares the reference positions of the patterns of the mask that appear on the translucent screen 33 when no lens for measurement is present on the optical axis of the measurement device (these reference positions being acquired during a preliminary pre-adjustment operation), with the positions of the corresponding patterns of the mask as seen on the translucent screen after they have been deflected by the lens L for measurement. The program deduces therefrom the deflections of the various rays detached by the active mask 23. The rays that have not been deflected correspond to the position of the optical center of the lens. If, as will usually be the case, there is no ray that is subjected to no deflection at all, the program proceeds with interpolation from the least-deflected rays, e.g. in application of the least-squares method on a polynomial model.

If the lens presents single-vision lens marking consisting in a center mark, the measurement point is assigned to the center mark.

If the lens presents marking appropriate for a lens with progressive power variation, then a frame of reference of the lens is identified using the marking and the measurement point is defined at the reference point for far vision and/or at the reference point for near vision, as defined by the manufacturer in the frame of reference marked on the lens.

If the lens presents a bifocal lens segment, then the measurement point is defined at the far vision reference point and/or at the near vision reference point as defined by the manufacturer relative to the identified segment.

With a marked progressive lens, the marking gives the positions of the far vision reference point and of the near vision reference point (at the centers of marks that are generally in the form of circles).

With a bifocal lens, the middle of the segment gives the position of the near point VP. The zone situated above the segment is the far zone VL, so it suffices to take a point in said zone in order to determine the far vision optical characteristics.

With a progressive lens having no paint marking, the microetching informs the system of the orientation and the position of the prism reference point of the lens. The program of the system 50 deduces therefrom a high zone corresponding to far vision and a low zone corresponding to near vision. The program then assigns successively or simultaneously as measurement points one point in each of said zones in order to obtain the far vision refraction power and the near vision refraction power. It is also possible to input positioning parameters for the far vision reference point and for the near vision reference point relative to the microetching in order to improve measurement accuracy.

With a marked single-vision lens, the marked cross constitutes the centering point of the lens which is then assigned as the measurement point.

With a lens that has been measured with a frontofocometer, the point of interest is the middle point determined thereby.

Once the point(s) of interest for measurement has/have been identified, the program of the system 50 measures prescription characteristics at said point(s) only.

Typically, the program of the system 50 calculates the power and the astigmatism of the ophthalmic lens.

For a single-vision lens, the distance between the focus and the rear face of the ophthalmic lens represents the front power.

The position of the rear face of the ophthalmic lens L in the absolute frame of reference of the apparatus is given either by providing a mean value or by providing a value that is deduced from information on the lens L for measurement, such as the curvature of the blank from which it was made, or by means of a feeler using suitable contactless or mechanical feeler means. This position is stored in a memory of the system 50. In order to determine the focus, the program of the system 50 compares the reference positions of the mask patterns 23 appearing on the translucent screen 33 when no lens for measurement is present on the optical axis of the measurement device (which reference positions are acquired during a preliminary pre-adjustment operation), with the positions of the corresponding patterns of the mask as displayed on the translucent screen after being deflected by the lens L for measurement. The program deduces therefrom the deflections of the various rays detached by the active mask 23. Given the distance between the mask 23 and the projection screen 33 (which is known by construction), the angles of deflection of the light rays detached from the beam by the mask 23 are deduced by calculation.

For the various rays striking the lens L at a plurality of adjacent points, the position and the direction of each light ray downstream from the lens is compared, thereby making it possible to calculate the position of the focus of the lens at the measurement point in question through which there passes the measurement axis situated at the center of the group of detached rays (and thus to calculate the power of the lens which is the reciprocal of the focal length of the ophthalmic lens) and also the astigmatism of the ophthalmic lens (the value and the axis of astigmatism) if it corrects astigmatism.

This measurement is therefore of a local kind in that it applies to a small measurement zone concentrated around the measurement point.

FIG. 4 shows an example of a local measurement performed on the far vision portion of a progressive lens. Only points corresponding to the reference circle of far vision are activated. In this embodiment, measurement requires only nine points.

By proceeding in this manner, it is thus possible very significantly to limit the total number of measurement points, and as a result to avoid the drawbacks of the state of the prior art.

The complexity of the measurement means is thus reduced. In particular, point identification problems are simplified because of the small number of points; for example there is no need to have recourse to special identification patterns (e.g. crosses or missing points). In particular, if only one beam is detached, there is no identification problem.

If the detached rays are more numerous (in practice in the range three to nine), the electronic and computer system 50 executes instructions for reading the positions of the impacts of the light rays on the projection screen that are suitable for distinguishing the various impacts from one another so as to associate them individually with the rays from which they are derived, exclusively from their positions on the projection screen.

The read instructions of the electronic and computer system 50 distinguish ray impacts exclusively by their distribution order on the screen.

The invention claimed is:

1. A method of measuring at least one refractive characteristic of a lens (L) at at least one specific measurement point of said lens by measuring deflection, the method comprising:
   generating a collimated light beam (28) directed towards the lens (L);
   detaching a localized group of at least three non-coplanar light rays (35) from the light beam (28), these light rays being grouped together about a measurement axis (37) in a measurement cylinder of a section that is substantially smaller than that of the lens (L) under measurement;
   measuring the deflection imparted by the lens (L) on the light rays; and
   deducing therefrom a value of the refractive characteristic of the lens (L) at the measurement point;
   wherein the lens (L) under measurement remains stationary relative to the light beam, and a position of the measurement axis (37) is variable from one measurement to another in order to be adapted to a position of the measurement point.

2. A method according to claim 1, in which the detached light rays (35) are selected automatically as a function of the position of the measurement point, such that the measurement axis (37) passes close to or through the measurement point under consideration, without moving the lens (L) under measurement.

3. A method according to claim 2, in which the measurement axis is such that the detached light rays (35) strike the lens (L) under measurement at a group of impact points presenting a center of gravity that coincides with the point of impact of the measurement axis (37) on the lens (L) under measurement.

4. A method according to claim 3, in which the measurement axis (37) intersects the lens (L) at less than 1 mm from the measurement point under consideration.

5. A method according to claim 3, in which the light rays of the beam (28) are detachable in application of a predefined geometry, and the detached rays (35) are selected in such a manner that the measurement axis (37) intersects the lens (L) as close as possible to the measurement point under consideration.

6. A method according to claim 1, in which the light rays are grouped together about the measurement axis within a radius of less than 10 mm.

7. A method according to claim 6, in which the light rays are grouped together about the measurement axis (37) within a radius of less than 5 mm.

8. A method according to claim 7, in which the light rays are grouped together about the measurement axis (37) within a radius lying in the range 3 mm to 4 mm.

9. A method according to claim 1, in which the measurement point applies to at least one position that is distinct from the optical center and the geometrical center of the lens.

10. A method according to claim 9, applied to measuring at least one refractive characteristic at at least two distinct points of a single lens.

11. A method according to claim 10, in which, for a multifocal measurement lens comprising a reference point for far vision and a reference point for near vision, the optical characteristic is measured at the reference point for far vision and at the reference point for near vision of the lens.

12. A method according to claim 10, in which measurements are performed successively at each measurement point, the position of the measurement axis being modified on each measurement to coincide, at least approximately, with the position on the lens of the measurement point under consideration, without moving the lens.

13. A method according to claim 10, in which a plurality of localized groups of light rays that are grouped together in measurement cylinders possessing sections that are substantially smaller than the lens and that do not overlap are detached simultaneously.

14. A method according to claim 1, in which, in order to measure the deflection imparted by the lens on the light rays detached from the beam, the positions of the impacts of said rays on a projection screen (33) are identified and the various impacts are distinguished from one another so as to be associated individually with the rays from which they are derived, exclusively on the basis of their positions on the projection screen.

15. A method according to claim 1, further comprising acquiring the position of the measurement point in an absolute frame of reference and of automatically selecting the localized group of light rays that are detached so that the measurement axis passes close to said measurement point.

16. A method according to claim 15, in which the step of acquiring the position of the measurement point further includes a step of reading marking on the lens (L) for measurement.

17. A method according to claim 15, further comprising:
defining the position of a frame of reference of the lens (L) under measurement in the absolute frame of reference;
defining the position of the measurement point in the frame of reference of the lens (L) under measurement; and
deducing therefrom the position of the measurement point in the absolute frame of reference.

18. A method according to claim 17, in which, for a lens (L) under measurement constituted by an ophthalmic lens for eyeglasses presenting marking that defines its frame of reference, the step of defining the frame of reference of the lens is preceded by a step of determining the positions of said marking in the absolute frame of reference, from which the position of the lens frame of reference in the absolute frame of reference is deduced by calculation.

19. A method according to claim 1, in which, for a lens that is an ophthalmic lens for eyeglasses, the method includes a step of identifying marking or absence of marking on the ophthalmic lens, from which the type of the ophthalmic lens is deduced.

20. A method according to claim 19, in which the number and/or the position of the measurement point(s) in the frame of reference of the lens is/are deduced, at least in part, from the marking and/or the type of the lens.

21. A method according to claim 20, in which, if the lens does not present any marking, the lens is classified as being a single-vision lens and the measurement point is assigned to the geometrical center of the outline of the lens.

22. A method according to claim 20, in which, if the lens presents marking of a single-vision lens in the form of a centering mark, the measurement point is assigned to said centering mark.

23. A method according to claim 20, in which, if the lens presents marking of a lens having progressive power variation, said marking is used to identify a frame of reference of the lens and the measurement point is defined as being the reference point for far vision and/or the reference point for near vision as defined by the manufacturer in the frame of reference marked on the lens.

24. A method according to claim 20, in which, if the lens presents a segment of a bifocal lens, the measurement point is defined at the reference point for far vision and/or at the reference point for near vision as defined by the manufacturer relative to the identified segment.

25. A method according to claim 1, in which the measured optical characteristic is spherical power and/or cylindrical power together with its orientation, and/or prismatic power together with its orientation.

26. An apparatus for measuring at least one refractive characteristic of a lens (L) at at least one specific point of said lens, the apparatus comprising:
a support (40) arranged to receive said lens, on its own or mounted in a frame;
on a first side of said support, lighting means (21) including an optical system for generating a collimated light beam (28) directed towards the lens (L) under measurement installed on said support;
on one side or the other of the support (40), detachment means (23) for detaching light rays (35) from the light beam, suitable for detaching a localized group of at least three non-coplanar light rays (35) grouped together about a measurement axis (37) in a measurement cylinder of section that is substantially smaller than the section of the lens (L) under measurement;
on a second side of the support (40), acquisition means (30) suitable for identifying the deflections imparted by the lens (L) under measurement on said detached light rays and for delivering a signal representative of said deflections; and
an electronic and computer system (50) programmed to deduce from said deflections the value of the refractive characteristic of the lens (L) under measurement at the measurement point;
the apparatus being characterized in that the support (40) is stationary relative to the beam (28) coming from the lighting means, and the detachment means (23) for detaching the light rays possess variable geometry controlled by the electronic and computer system (50) to modify the position of the measurement axis (37) as a function of the position of the measurement point.

27. An apparatus according to claim 26, in which the detachment means (23) are controlled by the electronic and computer system (50) to select the detached light rays (35) automatically in such a manner that the position of the measurement axis (37) is modifiable on each measurement to pass close to or through the measurement point under consideration, without moving the lens (L) under measurement.

28. An apparatus according to claim 27, in which the measurement axis (37) is such that the detached light rays (35) strike the lens (L) under measurement at a group of impact points having a center of gravity that coincides with the point of impact of the measurement axis (37) on the lens (L).

29. An apparatus according to claim 28, in which the electronic and computer system (50) is programmed to control the detachment means (23) in such a manner as to select the detached light rays (35) automatically so that the measurement axis (37) intersects the measurement lens (L) at less than 1 mm from the measurement point under consideration.

30. An apparatus according to claim 27, in which the detachment means (23) are designed to detach selectively a set of predetermined detachable light rays, and the electronic and computer system (50) is programmed to control the detachment means (23) in such a manner as to select the detached light rays (35) automatically so that the measurement axis (37) intersects the lens (L) under measurement as close as possible to the measurement point under consideration.

31. An apparatus according to claim 26, in which the light rays are grouped together about the measurement axis within a radius of less than 10 mm.

32. An apparatus according to claim 31, in which the light rays are grouped together about the measurement axis (37) within a radius of less than 5 mm.

33. An apparatus according to claim 32, in which the light rays are grouped together about the measurement axis (37) within a radius lying in the range 3 mm to 4 mm.

34. An apparatus according to claim 26, in which the detachment means (23) for detaching rays from the light beam comprise a transparent active screen or mask that is stationary relative to the lens (L) and suitable under the control of the electronic and computer system (50) for selectively displaying in positive or negative manner each of at least three detachment patterns (29) of rays grouped together about at least two distinct measurement axes (37).

35. An apparatus according to claim 34, in which the active mask is a graphics screen comprising an array of patterns (29) that are individually activatable under the control of the electronic and computer system (50).

36. An apparatus according to claim 35, as dependent on claim 31, in which the electronic and computer system (50) is programmed to activate a given number of patterns (29) and to select the activated patterns from the set of patterns in the array of the detachment mask (23) in such a manner that the center of gravity of the activated patterns (29) is situated as close as possible to the measurement point under consideration.

37. An apparatus according to claim 35, in which the graphics screen is an LCD screen.

38. An apparatus according to claim 26, in which the detachment means for detaching rays from the light beam comprise a passive mask having at least three permanent ray-detachment patterns and that is movable with at least one degree of freedom perpendicularly to the measurement axis.

39. An apparatus according to claim 38, in which the passive mask is movable perpendicularly to the measurement axis with a second degree of freedom distinct from the first.

40. An apparatus according to claim 26, in which, for a lens (L) to be measured installed on the support (40), the electronic and computer system (50) possesses at least one mode of operation in which it controls the light ray detachment means (23) to select a group of light rays in such a manner that the measurement axis (37) passes close to a measurement point that is substantially distinct from the optical center and the geometrical center of the lens (L) to be measured.

41. An apparatus according to claim 40, in which the electronic and computer system (50) possesses a memory in which a marker of the multi-focal or single-vision type of the lens (L) under measurement is written, and in which, if the marker indicates that the lens to be measured is of the multi-focal type, the electronic and computer system (50) controls the light ray detachment means (23) so that the measurement points include the far vision reference point and the near vision reference point of the multi-focal lens.

42. An apparatus according to claim 26, in which, for a lens (L) to be measured installed on the support (40), the electronic and computer system (50) possesses at least one mode of operation in which it controls the light ray detachment means (23) so that they select successively or simultaneously at least two distinct groups of light rays (35) grouped together about two distinct measurement axes (37) passing through two distinct measurement points of a single lens (L) to be measured.

43. An apparatus according to claim 26, in which the acquisition means (30) comprise a projection screen (33) onto which the detached rays (35) are projected, and a position sensor (31) for sensing the positions of the impacts (36) of said rays on the projection screen (33).

44. An apparatus according to claim 43, in which the electronic and computer system (50) executes instructions for reading the positions of the impacts (36) of the light rays (35) on the projection screen (33) that are suitable for distinguishing between the various impacts so as to associate them individually with the rays from which they are derived, exclusively on the basis of their positions on the projection screen (33).

45. An apparatus according to claim 26, including means (30) for acquiring the position of the measurement point in the absolute frame of reference and for controlling the detachment means (23) to select the localized group of detached light rays (35) automatically in such a manner that the measurement axis (37) passes close to said measurement point.

46. An apparatus according to claim 45, in which the means (30) for acquiring the position of the measurement point include means for reading marking on the lens (L).

47. An apparatus according to claim 45, the apparatus including means for identifying the position of the measurement point, said means including:
means for defining and storing in a memory of the electronic and computer system (50) the position of a frame of reference of the lens in an absolute frame of reference; and
means for defining and storing in a memory of the electronic and computer system (50) the position of the measurement point in the frame of reference of the lens (L);
the electronic and computer system (50) being programmed to deduce from the position of the frame of reference of the lens (L) in the absolute frame of reference and from the position of the measurement point in the frame of reference of the lens, the position of the measurement point in the absolute frame of reference.

48. An apparatus according to claim 47, in which the means for defining and storing the position of a frame of reference of the lens (L) in an absolute frame of reference include image recognition means suitable for locating marking of the ophthalmic lens and for deducing therefrom the position of the frame of reference of the lens in the absolute frame of reference.

49. An apparatus according to claim 26, for measuring an ophthalmic lens and including image recognition means suitable for identifying the marking or lack of marking on the ophthalmic lens, and for deducing therefrom the type of the ophthalmic lens and for writing in the memory of the electronic and computer system (50) the marker corresponding to the detected type of the lens.

50. An apparatus according to claim 49, in which the electronic and computer system (50) is programmed to deduce automatically from the type of the lens the number and/or position(s) of the measurement point(s) in the frame of reference of the lens.

* * * * *

UNITED STATES PATENT AND TRADEMARK OFFICE
CERTIFICATE OF CORRECTION

| | |
|---|---|
| PATENT NO. | : 7,742,158 B2 |
| APPLICATION NO. | : 11/661983 |
| DATED | : June 22, 2010 |
| INVENTOR(S) | : Fabien Divo et al. |

It is certified that error appears in the above-identified patent and that said Letters Patent is hereby corrected as shown below:

In claim 36 at column 19, line 22, delete "35" and insert --30--, and delete "as dependet on";

In claim 36 at column 19, line 23, delete "claim 31";

In claim 36 at column 19, lines 25 and 26, delete "the array" and insert --an array--; and In claim 36 at column 19, line 26, delete "detachment mask" and insert --detachment means--.

Signed and Sealed this
Eighteenth Day of January, 2011

David J. Kappos
*Director of the United States Patent and Trademark Office*